W. S. BOWEN
July 1, 1930. FEED REGULATING APPARATUS FOR LIQUIDS Re. 17,718
Original Filed Dec. 24, 1926
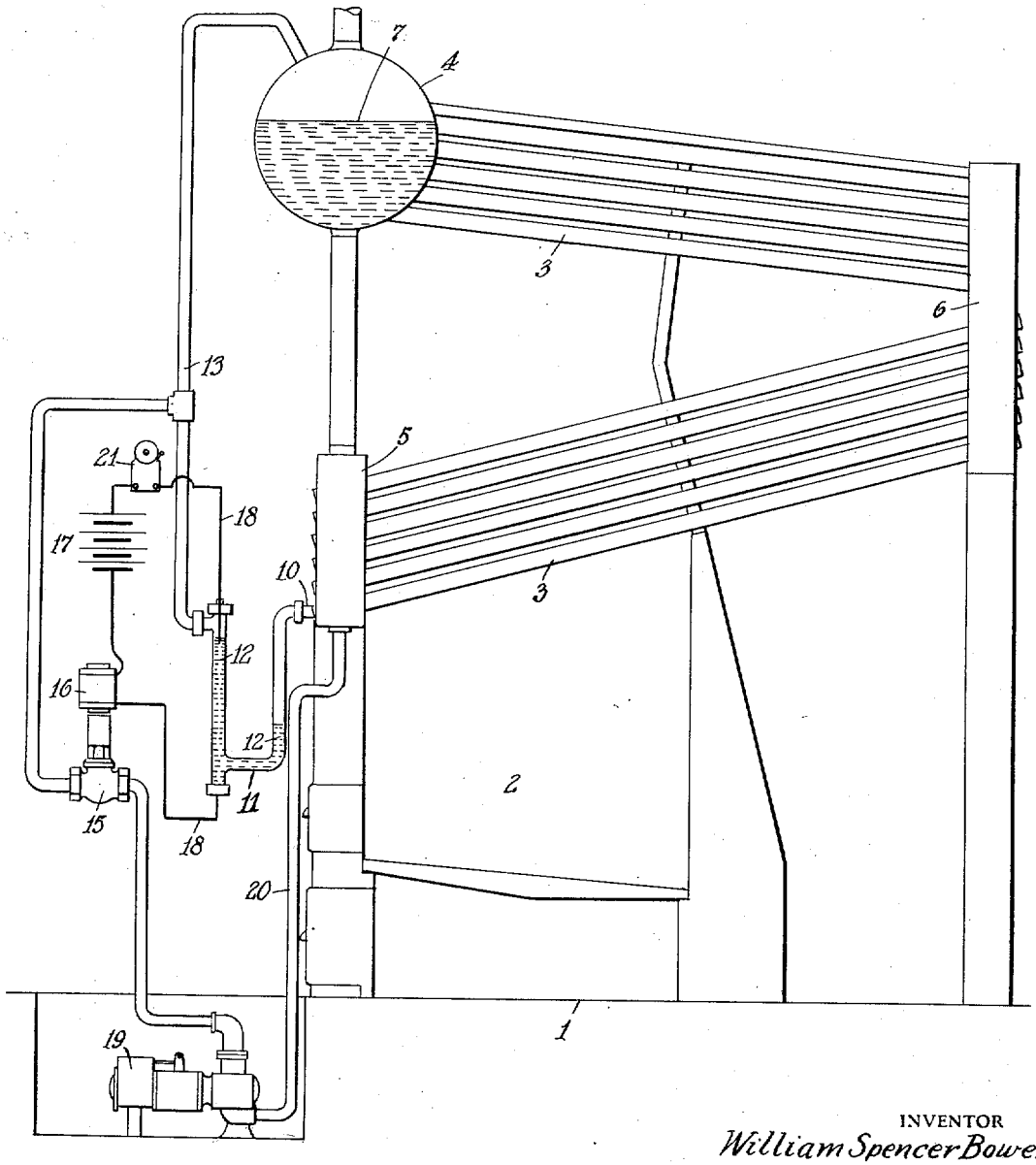
INVENTOR
William Spencer Bowen
BY
Redd & Schuetz
ATTORNEY Reissued July 1, 1930 Re. 17,718

UNITED STATES PATENT OFFICE

WILLIAM SPENCER BOWEN, OF WESTFIELD, NEW JERSEY, ASSIGNOR TO SMOOT ENGINEERING CORPORATION, OF NEW YORK, N. Y., A CORPORATION OF DELAWARE

FEED-REGULATING APPARATUS FOR LIQUIDS

Original No. 1,651,992, dated December 6, 1927, Serial No. 156,830, filed December 24, 1926. Application for reissue filed November 27, 1929. Serial No. 410,270.

The invention relates to a system for controlling the supply of water or other liquid to a steam boiler or other evaporator in order that the proper quantity may be maintained therein; and it relates more especially to the high pressure type of boiler wherein great fluctuations of the temperature of the water may occur. With the very considerable differences in temperature which may prevail in boilers of this type, it will be apparent that the actual volume of the water of the boiler will swell or contract appreciably in accordance with the temperature and load conditions. There is with the present apparatus in general use, therefore, great difficulty in maintaining the proper quantity of water in the boiler since the position of the water level in the gauge glass does not afford a true index of the quantity, or rather mass, of the water therein. Moreover, the usual gauge glass for the feed water is of necessity located at a position corresponding to the normal level of the water in the boiler and is generally at a considerable distance from the boiler floor level, making it difficult for the operator to view the indication in the gauge glass.

The present invention has for its object a novel feed regulating apparatus for maintaining the proper quantity of water or other liquid in the boiler or other evaporator for liquid and irrespective of temperature and load conditions; also, to enable indicating apparatus therefor to be located at a suitable point so as to be convenient for observation.

The nature of the invention, however, will best be understood when described in connection with the accompanying drawing, which is a more or less diagrammatic representation of the invention as embodied, for example, in connection with a steam boiler.

Referring to the drawing, 1 designates the floor of a boiler room or the like and by which is supported the boiler structure embodying the furnace portion 2 and the boiler tubes 3 and drum 4, as well as the headers 5 and 6 for the tubes. The drum 4 is supposed at all times to contain water, the normal level of same being indicated at 7; and heretofore it has been the practice to control manually the supply of water to the boiler in observing the level of same in the drum through a suitable gauge glass or the like, as is well understood; or, automatically, by means of suitable float controlled apparatus, the float rising and falling with the level of the water in the drum of the boiler. Further expedients, such as steam and electrically controlled apparatus, have been utilized for this purpose; but all depend in their operation on the actual level of the water in the drum.

In accordance with the present invention, nothing of this nature is employed; but the operation, while entirely automatic, is dependent not on the actual level of the water in the boiler but rather upon its density at a predetermined temperature. That is to say, while the actual level of the water may vary within comparatively large limits—the minimum, of course, being always above the safe level—the operation of the feed mechanism for supplying the water to the boiler is entirely dependent upon the actual mass or weight of the water in the boiler.

For example, a connection 10 is taken from the lowermost portion of the header 5, and which is also the lowest point of the water in the boiler, to one leg of a U-tube member 11 containing a mercury column 12, the other leg of the U-tube member 11 being connected through the connection 13 with the drum 4 and at a point such that it will always be open to the steam space thereof. By this means, the boiler pressure will always remain equalized in the two legs of the U-tube member upon opposite sides of the mercury column 12 thereof, thus balancing this column. The water of the boiler, however, will disturb this balance to an extent depending upon the hydraulic head thereof. However, the height of this column, as will be understood, is a function of the temperature of the water, so that even though the actual height of the water column increases with increase of temperature, and vice versa, this difference in height will have no effect upon the position of the mercury column 12, as the actual weight of the water acting thereon is not altered. Means, hereinafter described, are provided for controlling the supply of water to the boiler through the variations in the height of the said mercury column 12; and it will be understood that such means are to be so adjusted that they will not be actuated until the weight of the aforesaid column of water, irrespective of its actual height in the boiler, falls below a certain predetermined amount and which would correspond to an unsafe level of the water in the boiler at the coolest temperature of said water employed therein.

Apparatus for affording the supply of water to the boiler may comprise any suitable well-known or special type of steam pump-control valve 15 actuated as by an electro-magnetic member as a solenoid 16 of any well-known or special design, said solenoid being in turn controlled by an electric current from a suitable source of supply as the battery 17. The said solenoid and battery are to be included in circuit with the U-tube member 11, one of the leads 18 being connected to the mercury column 12 and the other extending into the top of the U-tube as at the steam leg thereof and at a point normally in contact with the mercury column 12 which corresponds to a safe quantity of water in the boiler. As the water in the boiler becomes depleted, it will be understood that the higher or steam leg of the mercury column 12 will gradually drop in the U-tube in accordance with the reduced weight of the water in said boiler and until it no longer makes contact with the one lead 18 extending through the upper portion of said U-tube leg. Under these conditions, the solenoid responds to actuate the pump-control valve for starting up the pump 19 and by which feed water is supplied through the connection 20 to the boiler, the pump continuing to operate until sufficient mass of water has been delivered to the boiler to again cause the mercury column 12 to ascend in the U-tube to a point where it makes contact with the exposed lead 18. This completes the circuit to the solenoid, operating thereby the pump control valve in manner well understood to shut off the supply; and, if desired, a relay alarm device indicated at 21 may be included in either of the leads 18 to give notice of the filling of the boiler.

Moreover, it will be noted that the U-tube is located substantially at the lowermost part of the boiler and therefore will be conveniently situated for observation, so that the actual conditions prevailing may be observed also in the U-tube 11.

I claim:

1. The combination with evaporating apparatus, and means for supplying liquid thereto; of a pressure-responsive device exposed constantly upon opposite sides substantially to the pressure at the lowermost part of the evaporator and to the pressure in the vapor space thereof; and means operated by the prevailing difference in pressure to which said pressure-responsive device is exposed for controlling the supply of liquid.

2. The combination with a steam boiler, and means for supplying water thereto; of a pressure-responsive device exposed constantly upon opposite sides substantially to the pressure at the lowermost part of the boiler and to the pressure in the vapor space thereof; and means operated by the prevailing difference in pressure to which said pressure-responsive device is exposed for controlling the supply of water to the boiler.

3. The combination with a steam boiler, and means for supplying water thereto; of a mercury U-tube member, having one leg connected to the boiler substantially at its lowermost point and the other leg constantly to the steam space of the boiler; an electro-magnetic device, and a source of electricity connected to the mercury column of said U-tube member; and means controlled by said electro-magnetic device under the influence of said mercury column for regulating the supply of water to the boiler.

4. The combination with a steam boiler, and means for supplying water thereto; of a mercury U-tube member having one leg connected to the boiler substantially at its lowermost point and the other leg constantly to the steam space of the boiler; an electro-magnetic device, and a source of electricity connected to the mercury column, the latter normally closing the circuit to said electro-magnetic device; and means controlled by said electro-magnetic device under the influence of the mercury of said U-tube for regulating the supply of water to the boiler.

5. The combination with a water-tube boiler and means for supplying liquid thereto, of a regulator for said supplying means, a device responsive to the density of the liquid in the boiler and to the level of the liquid therein, and means for controlling said regulator by said device to maintain a predetermined relation between said density and said level.

6. The combination with evaporating apparatus, and means for supplying liquid thereto, of regulating apparatus therefor including two chambers, a connection between one of said chambers and the lowermost part of the evaporator, a connection between the other of said chambers and the vapor space of the evaporator whereby the difference in pressure between said chambers acts to control the supply of liquid.

7. The combination with a steam boiler and means for supplying water thereto, of a device responsive to the difference in pressure between the vapor space of the boiler and the lowermost part of the boiler, and means controlled by said device tending to adjust the feed water supplying means upon variation in said pressure difference.

In testimony whereof, I have signed my name to this specification.

WILLIAM SPENCER BOWEN.